Feb. 1, 1972  HANS-GEORG TRIESCHMANN ET AL  3,639,377
PRODUCTION OF PROPYLENE POLYMERS
Filed Aug. 7, 1968   2 Sheets-Sheet 1

INVENTORS:
HANS-GEORG TRIESCHMANN
KARL WISSEROTH
RICHARD SCHOLL
RUDOLF HERBECK

BY: Marzall, Johnston, Cook & Root
ATT'YS

United States Patent Office 3,639,377
Patented Feb. 1, 1972

3,639,377
PRODUCTION OF PROPYLENE POLYMERS
Hans-Georg Trieschmann, Hambach, Karl Wisseroth, Ludwigshafen (Rhine), Richard Scholl, Gruenstadt, and Rudolf Herbeck, Frankenthal, Pfalz, Germany, assignors to Badische Anilin- & Soda-Fabrik Aktiengesellschaft, Ludwigshafen (Rhine), Germany
Filed Aug. 7, 1968, Ser. No. 750,941
Claims priority, application Germany, Aug. 10, 1967, P 17 20 292.5
Int. Cl. C08f 3/10, 3/06
U.S. Cl. 260—93.7         5 Claims

ABSTRACT OF THE DISCLOSURE

Process for the polymerization of propylene in the gas phase in which propylene in liquid form is introduced into a reaction zone, vaporized therein and polymerized with a catalyst having high activity.

---

Figure 1:
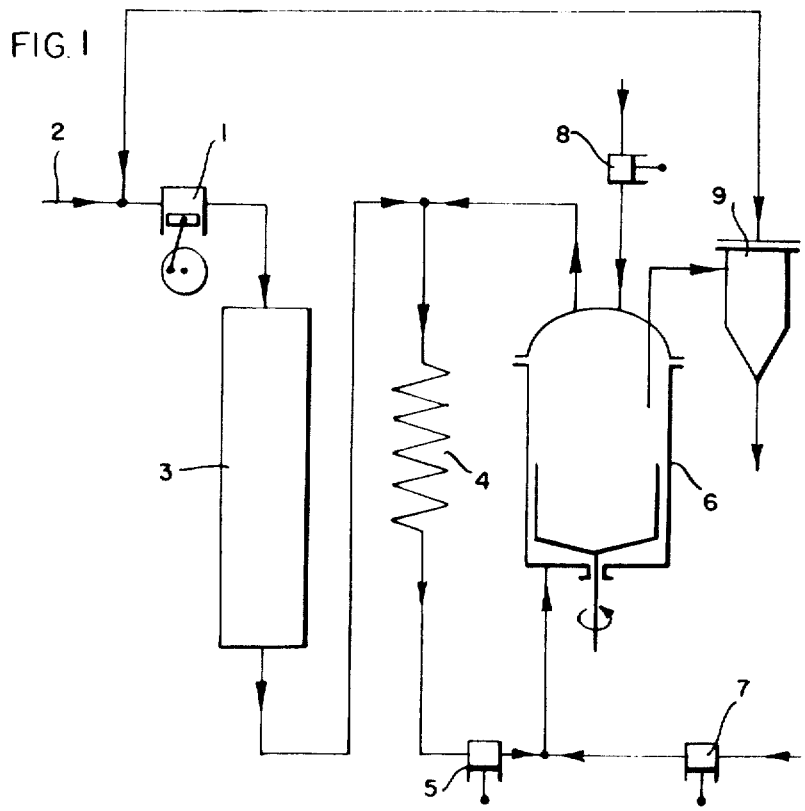

This invention relates to a process for the production of propylene in the gas phase in which polymers having larger soluble fractions are obtained than has been the case in prior art methods.

In conventional industrial methods for the production of propylene polymers propylene is polymerized in organic solvents under the action of catalysts known as stereospecific catalysts, which may consist for example of titanium trichloride and organoaluminum compounds. After polymerization the insoluble polymers are separated from the liquid phase, while at the same time catalyst residues are removed. The soluble polymers obtained remain in the solvent so that in the prior art methods propylene polymers are obtained whose fraction which is soluble in boiling n-heptane is usually less than 10% by weight. It has moreover been found that in the process of polymerizing propylene in the presence of solvents there is achieved a relatively low catalyst yield, i.e. the proportion of polymers formed in parts by weight with reference to 1 part by weight of catalyst. Since the catalyst constituents present in appreciable amounts in the polymer interfere with the further processing of the product, it is necessary to separate substantially all of the catalyst constituents from the polymer. The known methods for the production of propylene polymers are therefore expensive and troublesome. It has also been proposed to polymerize propylene in the gas phase. In this method however only very small catalyst yields are achieved so that it is necessary to remove the catalyst constituents from the polymer prior to further processing, the soluble constituents of the polymer also being separated.

It is an object of this invention to provide a process for the production of polymers having a high proportion of soluble constituents. Another object is to provide a process for the polymerization of propylene in which high catalyst yields are achieved.

In accordance with this invention these and other objects of the invention are achieved in a process in which propylene which is suitable for achieving a catalyst activity of at least 3000 parts of polymer per part of catalyst per hour is introduced in liquid form into a reaction zone, evaporated therein and polymerized, a catalyst being used whose molar ratio of titanium to aluminum compound is within the range from 1:05 to 1:6.

Propylene polymers with a relatively high fraction of soluble polymer, which is generally more than 15%, are obtained according to the process. This fraction is the fraction in percent by weight of the polymer which is soluble in boiling n-heptane. It is found, surprisingly, that the finely powdered polymers obtained by the process do not bond or fuse together in spite of the relatively high proportion of soluble constituents, even at temperatures of about 100° C. The polymers may be obtained with a catalyst yield which is more than 10,000, in most cases from 15,000 to 25,000, parts of polymer per part of catalyst. The polymers may therefore be further processed without special purification, i.e. without separating the catalyst, and further processing does not present any difficulty. As compared with polymers of the same mean molecular weight which have only small soluble fractions, the polymers according to this invention (because of their high soluble fraction) can be processed particularly easily on the machines conventionally used for processing polymers. Furthermore, moldings prepared from the polymers have better impact strength properties than moldings of propylene polymers having smaller soluble fractions. The viscosity numbers of the polymers are from about $[\sigma]=3$ dl./g. to 10 dl./g.

Homopolymers of propylene and copolymers of propylene with other monomers copolymerizable with propylene can be obtained by the process. Other olefins, for example ethylene, butene and butadiene, are particularly suitable as comonomers. The comonomers are preferably used in the copolymerization in amount of up to 7% or even 10% by weight. It is necessary for the process that the propylene (and any other monomers used) should have a particularly high degree of purity. The degree of purity may most advantageously be assessed by comparative polymerization tests based on the catalyst activity. The catalyst activity is defined as the number of parts of polymer obtained per part of catalyst per unit of time.

The propylene and any other comonomers should have a degree of purity at which the catalyst activity is at least 3000, preferably at least 5000. To assess the degree of purity, the catalyst activity is advantageously determined on purified monomers by polymerization in a 1-liter reactor under a pressure of 30 atmospheres at a temperature of 80° C. with a catalyst which has the following composition: 50 milligrams of titanium trichloride ($TiCl_3 \cdot \frac{1}{3} AlCl_3$) + 100 milligrams of triethyl aluminum.

Propylene having the said degree of purity may be obtained for example by passing unpurified propylene at a temperature of from 50° to 100° C. (the temperature to be set up depending on the degree of contamination) through a tower filled with finely grained aluminum and/or iron oxide. In this purification process, a small amount of low molecular weight liquid to waxy products is formed which is deposited on the aluminum or iron oxide. Another suitable purification composition, which can be used under about the same conditions, is magnesium silicate on which finely divided metallic copper has been precipitated.

Polymerization of propylene (if desired mixed with other monomers) is carried out in the gas phase. The advantages of the process, i.e. high space-time yields, are only achieved when the heat of polymerization in the reaction zone can be effectively removed. Since polymerization is carried out in the absence of solvents, heat transfer to external cooling surfaces, for example the cooling jacket of the reactor, is out of the question. In order that the heat of polymerization should be effectively removed, the monomeric propylene (with or without other comonomers) is introduced in liquid or partly liquefied form into the reaction zone. During polymerization, the fraction of unpolymerized propylene evaporates while absorbing the heat of polymerization. The evaporated propylene is removed from the reaction zone and condensed again outside the reaction zone. The liquid propylene (together with fresh propylene) is returned to the reaction zone. It is advantageous to recycle the propylene, liquid propylene being introduced into the reaction zone and gaseous withdrawn. When the propylene fed into the reactor is completely liquefied, about four to five times the amount of propylene polymerized is required per unit of time to remove the heat of polymerization in the circulation system. The removal of heat according to the principle of internal cooling also causes intense mixing of the solid polymer powder with the gas phase. Local overheating in the reaction zone is avoided in this way. This is of particular importance because the mean molecular weight and the fraction of soluble polymers is a function of the temperature. It is particularly advantageous to use a reactor having a spiral stirrer.

Polymerization is advantageously carried out at pressures of more than 10 atmospheres and less than 100 atmospheres. It is preferable to use the range between 20 and 60 atmospheres. The polymerization temperature should, if possible, be less than 140° C., advantageously in a range of from 70° to 120° C.

Catalysts based on mixtures consisting essentially of titanium trichloride and organoaluminum compounds are suitable for the process. It is particularly advantageous to use catalysts containing titanium trichloride, aluminum chloride and triethyl aluminum mixed together. Of these catalyst mixtures, those have proved to be especially suitable in which the alkyl aluminum/titanium components are in the range from about 0.5 to 6.

The invention is illustrated by the following examples.

EXAMPLE 1

As illustrated in FIG. 1 of the drawings, fresh propylene from line 2 is compressed in a compressor 1 to 35 atmospheres and fed into a purification tower 3 which is filled with aluminum oxide and is heated to a temperature of about 90° C. The propylene is purified here to such an extent that a catalyst activity of 5000 parts of polymer per part of catalyst per unit time can be achieved. After having passed through a heat exchanger 4 (in which complete condensation and cooling to about 30° C. takes place) the liquefied propylene is supplied through pump 5 to a reactor 6 and injected into the polymerizing powder layer which is mechanically agitated by a stirrer. Complete evaporation and heating up to the reaction temperature thus takes place with absorption of the heat of polymerization. The excess propylene escapes at the top of the reactor 6 and is recycled to the heat exchanger 4 for common condensation with fresh propylene. An about 4.5-fold excess of propylene is required at a reaction pressure of 35 atmospheres and a reaction temperature of 90° C. in order to absorb the whole of the heat of polymerization. One catalyst component ($C_1$) consisting of $TiCl_3 \cdot 1/3 AlCl_3$ is supplied continuously as a suspension in cyclohexane to the stream of liquid propylene through another pump 7. The second component ($C_2$) consisting of $Al(C_2H_5)_3$ is supplied as a solution in cyclohexane through a pump 8 to the top of the reactor.

The polymer formed is finally discharged pneumatically through a dip tube into a cyclone 9, an amount of propellant gas of about 15% by weight (with reference to the discharged polymer) being supplied as recycle propylene to the compressor 1.

With a continuous supply of 17 g. of $TiCl_3 \cdot 1/3 AlCl_3$ per hour and a continuous supply of 85 g. of $Al(C_2H_5)_3$ per hour about 350 kg. per hour of hard-grained, free-flowing polymer is obtained from the reactor 6 which has a capacity of 5 m.$^3$. This is equivalent to a catalyst yield of about 20,000 parts of polymer per part of catalyst (with reference to $TiCl_3 \cdot 1/3 AlCl_3$).

The viscosity number of the polymer is $[\eta]=6.0$ dl./g., the fraction soluble in boiling n-heptane is 28.0% by weight and the fraction soluble in boiling isopropanol 1.2% by weight.

The mean residence time of the polymer in the reactor is four hours, the reactor being about 80% full and the bulk density of the polymer being 0.35 g./cm.$^3$.

Figure 2:
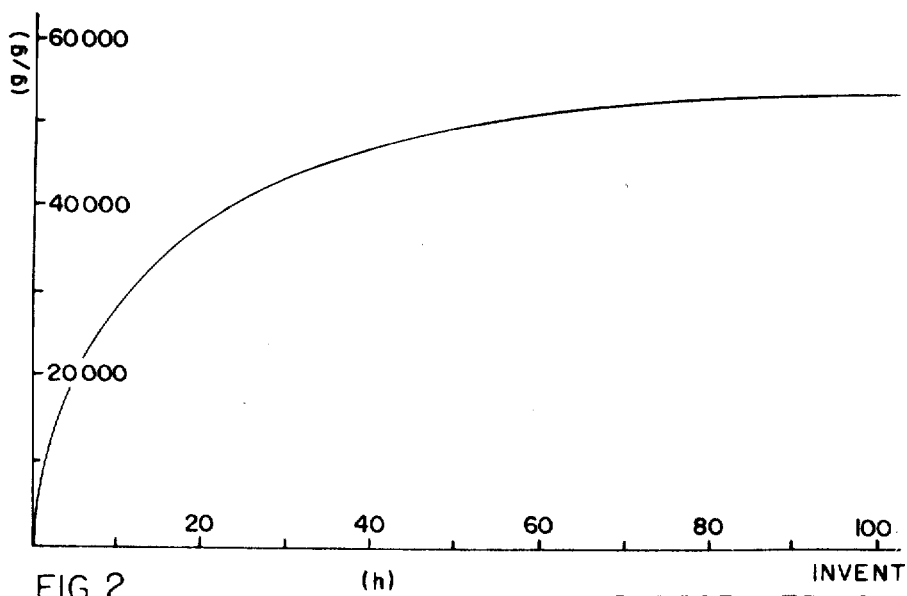

FIG. 2 illustrates the relationship between the catalyst yields achievable and an increase in the residence time, which at the same hourly polymerization output involves an increase in the reactor volume.

EXAMPLE 2

Figure 3:
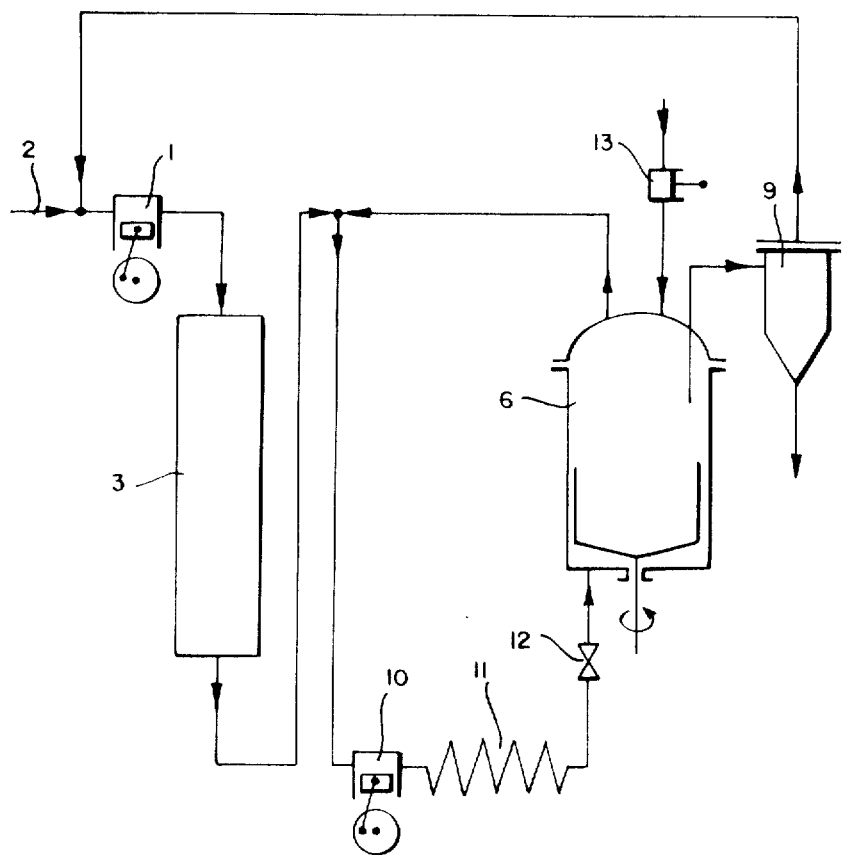

FIG. 3 shows another embodiment of the polymerization process. Propylene from a line 2 is compressed to 35 atmospheres in a gas compressor 1. The propylene is supplied via a purifying tower 3 through a compressor 10 to a heat exchanger 11. The purified propylene is compressed to 100 atmospheres in compressor 10. After having been cooled in the heat exchanger 11 (in which the heat of polymerization carried in the circulation system is also removed) the compressed propylene is expanded through a valve 12 into the reactor 6. Partial to complete liquefaction is thus achieved. The heat of polymerization is absorbed by reevaporation and heating to the temperature of the reactor. Depending on the degree of liquefaction aimed at in the expansion, an excess of about 4.5 to 10 times the amount of monomer has to be recycled. The catalyst mixture is introduced into the reactor through a pump 13; the polymer is discharged from a cyclone 9.

This type of heat removal with a compression stage in the cooling cycle is especially suitable for alternating polymerization of propylene and ethylene which results in copolymers which have increased resistance to low-temperature brittleness and are particularly valuable in use. In view of the critical temperature of ethylene of only +9.5° C., it is not possible to adopt the procedure of Example 1 because normal room temperature or cooling water temperature is not sufficient to liquefy ethylene.

We claim:
1. A process for producing propylene polymers containing at least a 15% fraction which is soluble in boiling n-heptane which comprises: introducing propylene in liquid form and optionally up to 10% by weight of a co-monomer into a reactor where it is vaporized and polymerized in the presence of Ziegler catalysts having a molar ratio of titanium trichloride to aluminum compound of from 1:0.5 to 1:6, said propylene having been purified to provide a catalyst activity of at least 3000 parts of polymer per part of catalyst, said polymerization being carried out at a pressure of 10 to 100 atmospheres and at a temperature of less than 140° C.

2. A process as claimed in claim 1 wherein unpolymerized propylene is discharged from the reaction zone, condensed and returned to the reaction zone together with fresh propylene.

3. A process as claimed in claim 1 wherein an amount of propylene which is four to five times the amount of propylene which polymerizes in the reaction zone per unit of time is recycled.

4. A process as claimed in claim 1 wherein the polymerization is carried out at a pressure of from 20 to 60 atmospheres and at a temperature of from 70° to 120° C.

5. A process as claimed in claim 1 wherein the propylene is suitable for achieving a catalyst activity of at least 5000 parts of polymer per part of catalyst per hour.

References Cited

UNITED STATES PATENTS 3,014,016 12/1961 Natta et al. -------- 260—93.5
3,014,018 12/1961 Natta et al. -------- 260—93.7

JOSEPH L. SHOFER, Primary Examiner
R. A. GAITHER, Assistant Examiner

U.S. Cl. X.R.

260—85.3, 88.2, 94.9 B

PO-1050
(5/69)

UNITED STATES PATENT OFFICE
CERTIFICATE OF CORRECTION

Patent No. 3,639,377  Dated February 1, 1972

Inventor(s) Hans-Georg Trieschmann et al

It is certified that error appears in the above-identified patent and that said Letters Patent are hereby corrected as shown below:

Column 1, line 67, "05" should read -- 0.5 --.

Column 2, line 20, "[$\sigma$]" should read -- [$\eta$] --.

Signed and sealed this 13th day of June 1972.

(SEAL)
Attest:

EDWARD M. FLETCHER, JR.            ROBERT GOTTSCHALK
Attesting Officer                  Commissioner of Patents